UNITED STATES PATENT OFFICE.

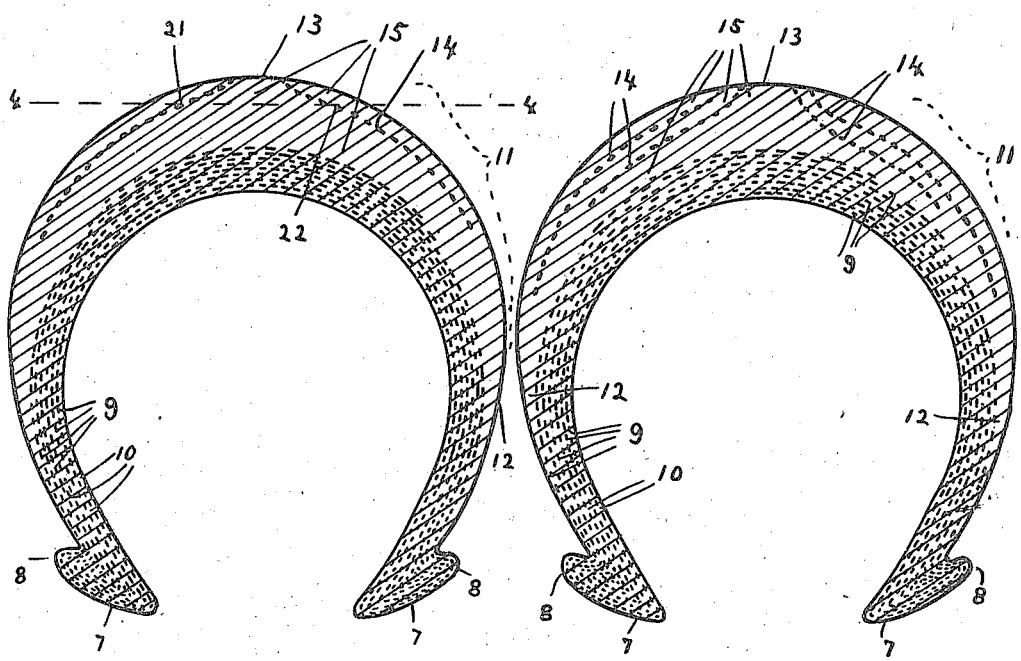
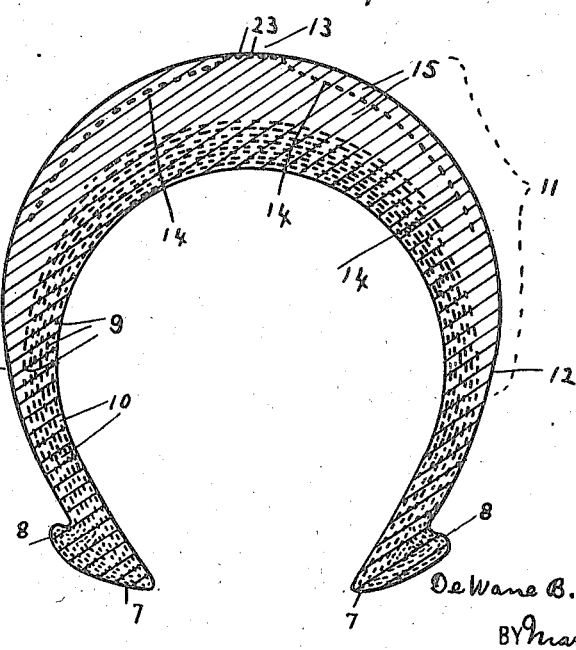

DE WANE B. SMITH, OF DEERFIELD, NEW YORK.

PNEUMATIC TIRE.

1,264,567.     Specification of Letters Patent.     Patented Apr. 30, 1918.

Application filed July 26, 1915. Serial No. 41,858.

*To all whom it may concern:*

Be it known that I, DE WANE B. SMITH, of Deerfield, in the county of Oneida and State of New York, have invented certain new and useful Improvements in Pneumatic Tires; and I do hereby declare that the following is a full, clear, and exact description thereof, which will enable others skilled in the art to which it appertains to make and use the same, reference being had to the accompanying drawings, and to the reference-numerals marked thereon, which form part of this specification.

My present invention relates to pneumatic tires and particularly to that part of the tire known as the "shoe" or outer casing.

One purpose of my invention is to provide such a tire of improved construction, of great durability and of a form not liable to be punctured.

A further purpose of my invention is to provide a tire which will combine great wearing qualities with adequate provision for making the tire at all stages of its use non-skidding.

A still further purpose of this invention is to provide a tire having its tread portion formed in the main of rubber or the usual rubber composition and having interspersed therethrough layers of loosely-woven fabric extending circumferentially of the tire and arranged at an angle to the tread surface so that both when new and as the tire wears down by continued use the edges of one or more of said layers of fabric will always extend to the then tread surface of the tire and operate as a preventive of skidding.

Further advantages and purposes of this invention will appear from the specification and claims herein.

Figure 1 is a transverse sectional view of one form of tire embodying my invention. Fig. 2 is a transverse sectional view of another form of tire embodying my invention. Fig. 3 is a transverse sectional view of a third form of tire embodying my invention.

Referring to the drawings in a more particular description, it will be seen that the tire as the shoe or casing therein illustrated is commonly called, has base portions 7 adapted to rest against the rim (not shown) in the usual way, any suitable means for adapting the tire to be retained on the rim, as for instance the usual ribs 8 and the usual interior layers of relatively closely woven fabric 9 embedded in rubber 10 forming the usual resilient walls of sufficient strength according to the character and purpose of the tire.

To this basis of a tire is added the tread portion 11 of any desired contour but preferably following the usual form of gradually increasing thickness from the sides 12 of the tire to the exterior or outer tread surface 13 that first comes in contact with the ground. This tread portion is composed in the main of rubber 15 or some of the usual satisfactory rubber compositions of such character as to produce the necessary combination of resiliency and resistance to wear incident to use of the tire. Interspersed through the rubber of said tread portion 11 are a few circumferentially extending layers 14 of relatively loosely or openly woven fabric, thoroughly united with the rubber 15 of the tread portion as by the said layers 14 being rubberized or coated with a layer of rubber and then laid into position in the tread portion of a tire with other layers of rubber of sufficient thickness to keep the layers 14 spaced apart the proper distance while the whole tire is vulcanized, uniting the tread portion with its rubber 15 and fabric 14 to the base of the tire composed of its layers of fabric 9 and rubber 10.

Describing first the form of tire shown in Figs. 1 and 2, the layers of fabric 14 are arranged in the rubber 15 of the tread portion 11 so that as the tire is viewed in transverse section, as shown in Figs. 1 and 2, said layers of fabric extend from the tread surface 13 inwardly and laterally to the opposite sides of the tire slanting or curving from the tread surface 13 and from the central line of the tire toward the sides 12 of the tire. In Fig. 1 there is shown a tire having two such layers of fabric 14, one to each side of the center line of the tire, while in Fig. 2 there is shown a tire having four of said layers of fabric 14 arranged two on each side of the center line of the tire, the layers on each side being separated or spaced from each other through their entire width from their exterior edge at the tread surface 13 to their inner edge toward their respective sides 12 of the tire. It will be obvious that tires embodying my invention may be constructed with one, two or more layers of fabric upon each side of the tire and that the location and arrangement thereof may be modified to a considerable extent without departing from the spirit of my invention.

In operation the tires now described will, from the time they are new until they are entirely worn out, have a tread surface composed in the main of rubber but extending about the tire circumferentially thereof will be the outer edges of the layers 14 forming a non-skidding or non-sliding contact of the tire upon the road or other surface being traveled. As only the outer edges of the layers of fabric 14 will be at any time exposed to wear, the fabric will wear down only as the main body of the rubber tread wears down thus insuring at all times about the tire several rows of non-skidding surfaces composed of the edges of the different layers of fabric and the dirt which naturally works into said fabric from the road. In this way the wearing quality of the rubber is utilized to the fullest extent and the lesser wearing quality of the fabric is utilized not to form the main contact surface but to form minor or lesser contact surfaces of sufficient extent to make a firm contact with the road and prevent skidding at times when the rubber of itself would not so operate.

The circumferentially extending layers of fabric 14 also act as a binder to hold the rubber of the tread portion firmly in place and prevent it from separating from the basis of the tire composed of the closely woven fabric 9 and its rubber 10.

Furthermore, the layers of fabric 14 tend to protect the tire from punctures or cuts in that their presence and arrangement in the tread portion operates to prevent sharp obstacles piercing or cutting through the tread portion, the slanting arrangement of the layers 14 particularly tending to deflect any object toward the side of the tire.

The curved or slanting arrangement of the layers of fabric 14 so arranged as to be always at less than a right-angle with their side of the tread surface, allows a greater width of fabric to be used than would be the case if the layers extended inwardly at a right-angle from the tread surface, thus providing greater extent of fabric to stand the wear. Moreover, this slanting arrangement operates as the tread portion gradually wears down to at all times keep the non-skidding contact edges of the fabric toward the opposite sides of the then tread surface. For example, when the tire shown in Fig. 1 has been worn down to the line 4—4, the then exposed edges of the layers of fabric 14, being at points 21 and 22, will be toward the opposite sides of the then tread surface where they will have the best opportunity to prevent skidding and will leave the central portion of the tread surface entirely of rubber to form the main contact surface of the tire upon the road.

A further advantage and result of constructing tires as herein disclosed is that the common tendency of tires to become heated in continued use, is very largely overcome.

In Fig. 3 is shown a modified form of my invention with the fabric layers 14 arranged as already described with regard to Fig. 1 but with what would be the outer edges of the two layers of fabric connected at the tread surface by a portion of fabric 23. In other words, the fabric shown is originally composed of one piece placed in the tire with its central surface forming the central part of the tread surface. This is for convenience in manufacturing the tire and also as an outside indication that the tire is a canvas-tread tire in the sense of having the layers of fabric embedded angularly in the tread portion.

It will be understood, of course, that where a tire such as shown in Fig. 3 has been used for a short time the exposed portion 23 of the fabric through its side exposure to the road and by reason of being at the point of greatest wear, will soon wear off and the tire will then be the same as shown in Fig. 1 and will operate in the same way.

It will be obvious that various modifications may be made from the tires herein shown and described without departing from the spirit of my invention as herein claimed.

What I claim as new and desire to secure by Letters Patent is:

1. The combination with a pneumatic rubber tire of two series of relatively few layers of loosely woven fabric spaced from each other and extending circumferentially of the tire, said series of layers being on opposite sides of the center of the tire, with each layer commencing at the surface of the tread but spaced from the center thereof, then extending in an oblique direction down into the tread and then a considerable distance down into its side of the tire, whereby the rubber at all times forms the central and greater portion of the tread surface and the outer edge of each layer extends to the tread surface toward the sides thereof while the body of each layer is embedded in the tread and its side of the tire, forming a protection against puncturing or cutting the tire.

2. The combination with a pneumatic rubber tire of two layers of loosely woven fabric spaced from each other and extending circumferentially of the tire, said layers being on opposite sides of the center of the tire, with each layer commencing at the surface of the tread but spaced from the center thereof, then extending in an oblique direction down into the tread and then a considerable distance down into its side of the tire, whereby the rubber at all times forms the central and greater portion of the tread surface and the outer edge of each layer extends to the tread surface toward the sides thereof while the body of each layer is embedded in the tread and its side of the tire, forming a protection against puncturing or cutting the tire.

In witness whereof I have affixed my signature, in the presence of two witnesses, this 22nd day of July, 1915.

DE WANE B. SMITH.

Witnesses:
C. D. PHILLIPS,
S. E. HOOKS.